(12) United States Patent
Myers et al.

(10) Patent No.: US 11,770,627 B1
(45) Date of Patent: Sep. 26, 2023

(54) SYSTEMS AND METHODS FOR DIRECT MEASUREMENT OF PHOTON ARRIVAL RATE

(71) Applicant: Ball Aerospace & Technologies Corp., Boulder, CO (US)

(72) Inventors: Mark Myers, Broomfield, CO (US); Ronald P. Earhart, Westminster, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 189 days.

(21) Appl. No.: 17/061,205

(22) Filed: Oct. 1, 2020

Related U.S. Application Data (60) Provisional application No. 62/910,604, filed on Oct. 4, 2019.

(51) Int. Cl.
*H04N 25/443* (2023.01)
*H04N 25/772* (2023.01)

(52) U.S. Cl.
CPC ......... *H04N 25/443* (2023.01); *H04N 25/772* (2023.01)

(58) Field of Classification Search
CPC .................. H04N 5/3454; H04N 5/37455
USPC ........................................................ 123/436
See application file for complete search history.

(56) References Cited

U.S. PATENT DOCUMENTS

| | | | |
|---|---|---|---|
| 2003/0001080 A1* | 1/2003 | Kummaraguntla | .... H04N 5/355 348/E3.018 |
| 2005/0259275 A1 | 11/2005 | Shoki | |
| 2005/0259285 A1 | 11/2005 | Shoki | |
| 2006/0046776 A1 | 3/2006 | Chen | |
| 2007/0013766 A1 | 1/2007 | Kim | |
| 2008/0117239 A1 | 5/2008 | Huang et al. | |
| 2009/0109427 A1* | 4/2009 | Yee | .......... G01J 1/46 356/218 |
| 2009/0213258 A1 | 8/2009 | Fowler | |
| 2010/0328394 A1 | 12/2010 | Huang et al. | |
| 2012/0057016 A1 | 3/2012 | Shen et al. | |
| 2012/0305750 A1 | 12/2012 | Barbier et al. | |
| 2014/0118579 A1 | 5/2014 | Kim et al. | |
| 2014/0320607 A1 | 10/2014 | Hamann et al. | |
| 2014/0327769 A1 | 11/2014 | Hamann et al. | |
| 2015/0021729 A1 | 1/2015 | Maehara | |
| 2015/0156413 A1 | 6/2015 | Do et al. | |

(Continued)

OTHER PUBLICATIONS

Schultz et al. "Digital-Pixel Focal Plane Array Technology," Lincoln Laboratory Journal, 2014, vol. 20, No. 2, pp. 36-51.

*Primary Examiner* — Lin Ye
*Assistant Examiner* — Chan T Nguyen
(74) *Attorney, Agent, or Firm* — Sheridan Ross P.C.

(57) ABSTRACT

Sensor systems and methods that provide an output in the form of a rate at which light is received by unit pixels within a sensor array are provided. Each unit pixel includes a photodetector that generates an electrical charge in response to receiving light, a charge accumulation area, and a comparator. Once the amount of charge in the accumulation area has reached some threshold amount, a counter is incremented. After the counter has been incremented a selected number of times, an output signal is generated, and the time at which the output signal is generated is marked or recorded. Different unit pixels receiving light at different rates therefore generate output signals at different times.

19 Claims, 6 Drawing Sheets

(56) References Cited

U.S. PATENT DOCUMENTS

| | | |
|---|---|---|
| 2017/0012073 A1 | 1/2017 | Maehara |
| 2017/0031862 A1 | 2/2017 | Yu |
| 2018/0013968 A1 | 1/2018 | Hamann et al. |
| 2018/0164155 A1* | 6/2018 | Mellot .................. G01J 1/42 |
| 2018/0313871 A1* | 11/2018 | Guenther .......... G01R 13/0254 |
| 2021/0344858 A1* | 11/2021 | Heim .................. H04N 25/771 |

* cited by examiner

SYSTEMS AND METHODS FOR DIRECT MEASUREMENT OF PHOTON ARRIVAL RATE

CROSS-REFERENCE TO RELATED APPLICATIONS

This application claims the benefit of U.S. Provisional Patent Application Ser. No. 62/910,604, filed Oct. 4, 2019, the entire disclosure of which is hereby incorporated herein by reference.

FIELD

Systems and methods for directly measuring the photon arrival rate at pixels of a focal plane array are provided.

BACKGROUND

Photodetectors, including but not limited to complementary metal oxide semiconductor (CMOS) image sensors and charge-coupled device (CCD) image sensors, are widely used in various applications. Typically, such sensors include thousands or even millions of photosensitive sites or pixels arranged in a two-dimensional focal plane array (FPA). Electronic or digital FPA image sensors are commonly used in general-purpose cameras, satellite or other remote imaging applications, and the like. In addition, electronic image sensors are used in various medical applications. As still another example, electronic image sensors are used in spectrometers and other instruments.

The pixels of an electronic photodetector convert incident light into electrical charge. The amount of charge produced during an exposure period is generally proportional to the number of photons received by the photodetector during the exposure period. As can be appreciated by one of skill in the art, an electronic image sensor operates by transferring the charge produced in the pixels of the detector array during the exposure period to a floating diffusion or other charge to voltage detector. The pixel is then reset, in anticipation of receiving light in connection with a next exposure period, for example as part of the next image frame.

Focal plane array technology has been advancing through various efforts, leading to new arrays with analog to digital convertors and counters contained completely in the FPA pixels. In particular, devices have been developed in which the charge well typically associated with each individual pixel has been replaced with a digital counter. In such devices, each pixel includes a small capacitor. As the capacitor fills, the counter is incremented. The number of times that the counter is incremented during the exposure period is proportional to the in-band incident light. The count, representing the amount of charge accumulated during the exposure period, is then provided as an output.

Other detectors, including Geiger-mode avalanche photo diodes, operate as photon timing detectors that record the time of an 'event' in the form of the arrival of some number of photons. The intent of such detectors is measuring range as part of the operation of a light detection and ranging (LIDAR) system. Accordingly, the event being timed is the time of flight of a photon or photons, and the output of such detectors is related to the time at which a photon or some quantity of light is detected by the detector.

SUMMARY

Embodiments of the present disclosure differ from other light or image sensors by measuring the amount of time needed by each pixel to collect a selected level of signal, instead of measuring an amount of light arriving at each pixel over a selected time period. This creates a 2-D measurement not for a signal level over an arbitrary unit of time but of the flux rate over the scene. Embodiments of the present disclosure include a digital focal plane array. The pixels of the array each include a counter that provides an output signal indicating the rate at which photons arrive at the photosensitive site. Systems and methods as disclosed herein can be applied to machine vision, surveillance, or other systems.

In accordance with embodiments of the present disclosure, light that is incident on one or more pixels of a sensor generates charge, and that charge is collected until a selected threshold amount has been reached. After the selected amount of charge has been collected by a pixel, an event signal is generated. The time at which the event signal is provided as an output and can be recorded. Accordingly, the time required to generate a selected amount of charge, which corresponds to some amount of incident light, is measured by a pixel in accordance with embodiments of the present disclosure. Moreover, embodiments of the present disclosure provide a rate of photon arrival at each pixel. Accordingly, the pixels within an array of pixels can generate event signals asynchronously.

A sensor system in accordance with embodiments of the present disclosure can include one or more unit pixels. Each unit pixel can include a photodetector, a comparator, a counter/trigger, and an event recorder. The photodetector is electrically connected to the comparator. The electrical connection between the photodetector and the comparator can include a charge accumulation region or area, for example in the form of an integrating capacitor. The comparator generates a signal in response to detecting a threshold amount of charge generated by the photodetector. The comparator is connected to the counter/trigger, which receives the signal generated by the comparator. The counter/trigger is one of incremented or decremented with each signal generated by the comparator, and generates an event signal in response to reaching a selected count value. The counter/trigger is connected to an event recorder that is operable to record a time of the event signal.

Additional features and advantages of embodiments of the present disclosure will become more readily apparent from the following description, particularly when considered together with the accompanying drawings.

DETAILED DESCRIPTION

Figure 1:
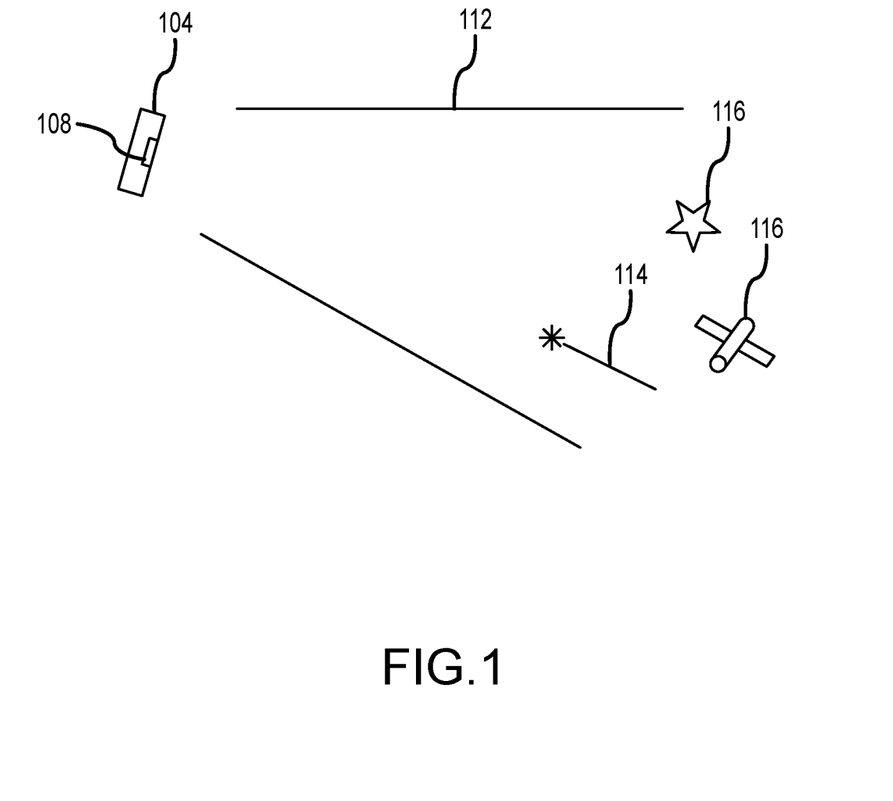
FIG. 1 depicts a sensor system receiving light from within a scene in accordance with embodiments of the present disclosure.

FIG. 1 depicts a platform 104 carrying a sensor system 108 in accordance with embodiments of the present disclosure. As used herein, a platform 104 can include, but is not limited to, a satellite, a manned spacecraft, an interplanetary spacecraft, an interstellar spacecraft, an orbiter, a lander, a missile, an aircraft, an unmanned aerial vehicle, a balloon, a stratospheric balloon, a terrestrial vehicle, a ship, a tower, an automated material or component handling apparatus, a robot, or any other mobile or stationary platform or device to which a sensor system 108 can be mounted. In general, the sensor system 108 collects light from within a field of view 112. As discussed herein, the sensor system 108 can be operated to provide information regarding the amount of time required to receive a selected amount of light. In accordance with at least some embodiments of the present disclosure, the output of the sensor system 108 can be in the form of the arrival rate of light at the sensor. In addition or as an alternative to collecting an image of a scene, a sensor system 108 in accordance with embodiments of the present disclosure can be operated to detect events, including but not limited to the appearance of a pulse of light 114, an object 116 arriving in a scene, an object 116 moving within a scene, or a change to the appearance of an object 116 within a scene.

Figure 2:
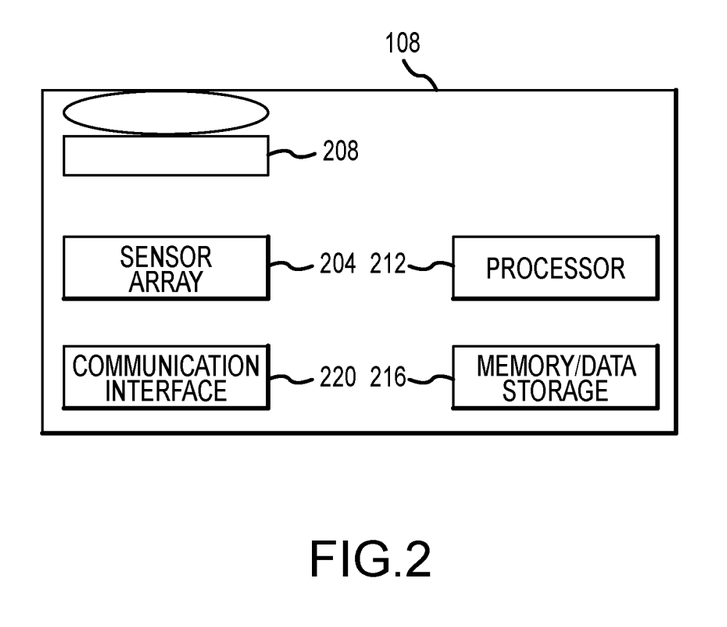
FIG. 2 depicts components of a sensor system incorporating a rate focal plane array in accordance with embodiments of the present disclosure.

FIG. 2 depicts components of a sensor system 108 in accordance with embodiments of the present disclosure. As shown, the sensor system 108 generally includes a rate sensor or focal plane array 204, an optical assembly 208, a processor 212, memory or data storage 216, and a communication interface 220. The optical assembly 208 collects light from within the field of view 112 of the sensor system 108, and directs that light to a light incident surface of the sensor array 204. The processor 212 can include a general purpose programmable processor, a graphics processing unit, a field programmable gate array, a controller, or other processing device or set of devices capable of executing instructions for the operation and control of the sensor system 108. The instructions executed by the processor 212, data output from the sensor array 204, and the like can be stored in the memory or data storage 216. The memory or data storage 216 can include one or more volatile or non-volatile solid-state-state memory devices, such as but not limited to RAM, SDRAM, or the like, and/or one or more mass storage devices, such as, but not limited to, hard disk drives, optical storage devices, solid-state drives, or the like. The instructions stored in the memory or data storage 216 can include application programming for operating the sensor array 204. In addition, the memory or data storage 216 can include application programming for analyzing or operating on output generated or produced by the sensor array 204, including the calculation of a rate or flux amount of light received at the sensor array 204. In accordance with still further embodiments, data obtained from the array 204 can be communicated to other systems or devices, in raw or processed form, through the communication interface 220.

Figure 3:
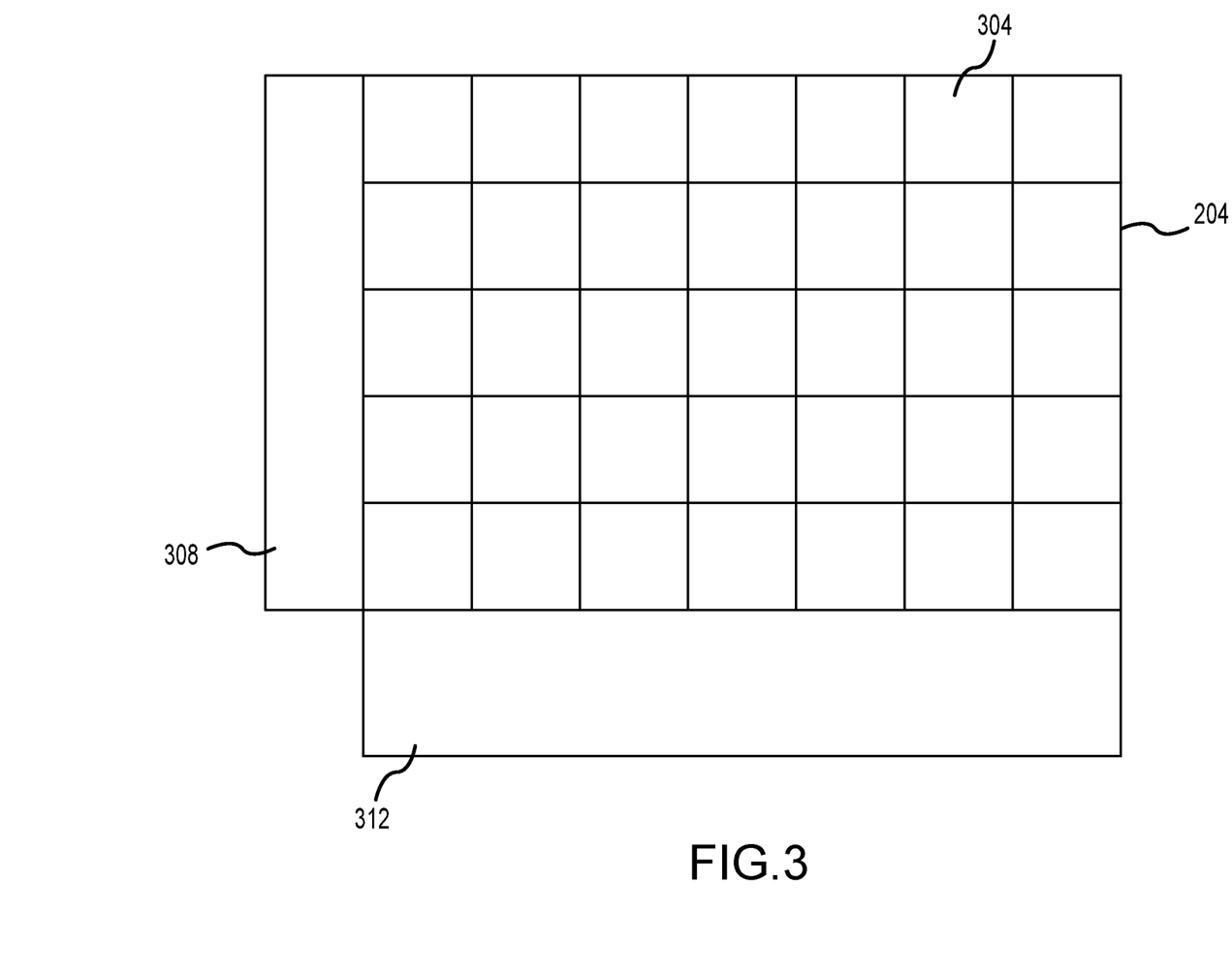
FIG. 3 depicts a rate focal plane array in accordance with embodiments of the present disclosure.

With reference now to FIG. 3, the rate sensor array 204 can include a plurality of unit pixels 304. In addition, the rate sensor array 104 can include control logic 308 and a readout circuit 312. The readout circuit can include signal lines that pass output signals from the pixels 304 to the processor 212 or memory 216. As examples, but without limitation, the rate sensor array 204 can include a backside illuminated CMOS image sensor composed of unit pixels 304 arranged in rows and columns to form a two-dimensional rate sensor array 204. Each unit pixel 304 includes a photo sensitive area in which charge is generated in response to the receipt of incident light. In addition, as discussed in greater detail elsewhere herein, each unit pixel 304 includes or is associated with circuitry operative to generate an output in response to the receipt of incident light that indicates an amount of time required for the subject unit pixel 304 to receive a selected or measured quantity of light. Accordingly, the rate sensor array 204 can implement what is referred to herein as a digital rate focal plane array (RFPA) that provides a two-dimensional measurement of the flux rate of light collected from within a scene. Moreover, as also discussed herein, the pixels 304 of a rate sensor array 204 in accordance with embodiments of the present disclosure can provide output signals asynchronously. That is, different pixels 304 included in the rate sensor array 204 can operate over different exposure periods and can provide output signals at different times.

Figure 4:
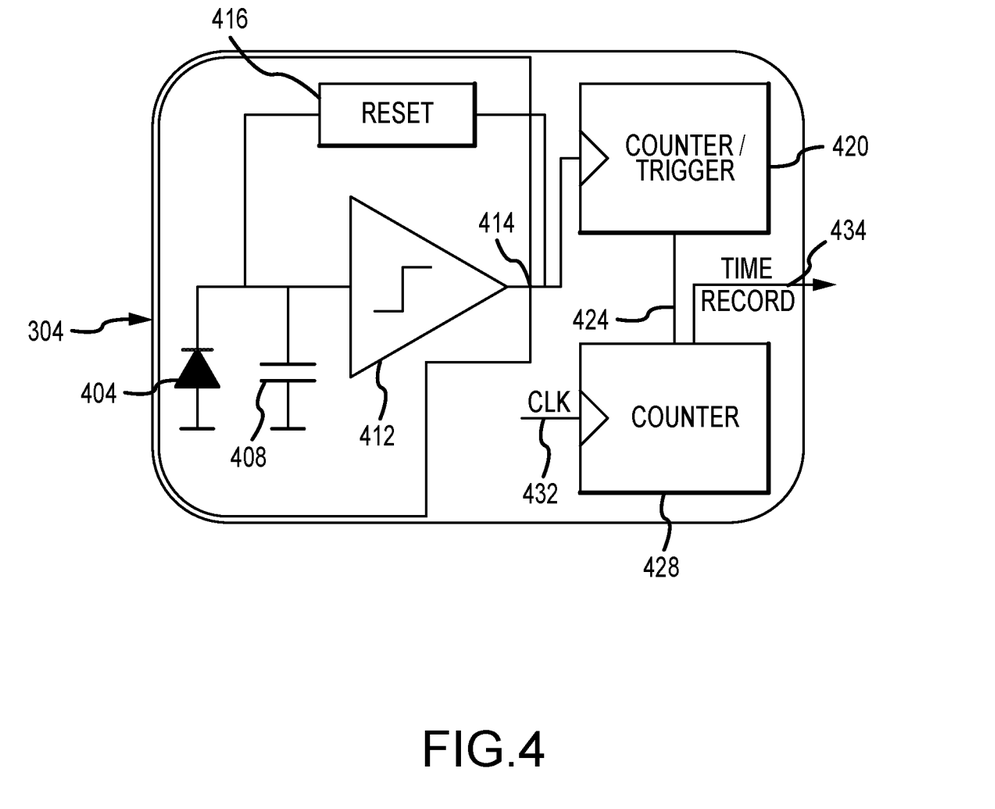
FIG. 4 depicts components of a rate focal plane array pixel in accordance with embodiments of the present disclosure.

The components of an example unit pixel 304 in accordance with embodiments of the present disclosure are depicted in FIG. 4. As shown, the unit pixel 304 generally includes a photodetector or photosensitive area 404 that generates charge in response to the receipt of incident light. In general, the photodetector 404 of a unit pixel 304 can be implemented by any structure or device that is capable of generating electrical charge in response to incident light. Accordingly, as examples, but without limitation, a photodetector 404 can be implemented as a photodiode formed in a silicon substrate or as a stacked structure incorporating an organic photoelectric conversion film layer. Moreover, the pixels 304 can be part of a front side or back side illuminated structure. A relatively small capacitance or charge accumulation region or area, for example in the form of an integrating capacitor 408, accumulates charge generated by the photodetector 404. A comparator 412 receives the charge on the capacitor 408 as an input. When the amount of charge on the capacitor 408 reaches a predetermined amount, the comparator 412 generates an output pulse 414. The output pulse 414 triggers a reset circuit 416 to return the capacitance on the capacitor 408 (i.e. the charge accumulation region) to a reference level. The output pulse 414 is also provided as an input to a counter/trigger 420. As can be appreciated by one of skill in the art after consideration of the present disclosure, each output pulse received at the counter/trigger 420 increments (or decrements) the count value held by the counter/trigger 420 such that the count value is proportional to the amount of light received by the photodetector 404. The counter/trigger 420 can be configured to output a trigger signal 424 when the count value has reached a selected number.

The trigger signal 424 can be provided to an event recorder, in this embodiment an output counter 428. The output counter 428 is incremented according to a clock signal 432. In response to receiving a trigger signal 424, the counter 428 generates an output in the form of a current count or clock value 434, which indicates the time at which the trigger event or signal 424 was generated. The count value 434 can be referenced to an absolute time, or can represent an amount of time elapsed since the unit pixel 304 was last reset. Accordingly, the unit pixel 304 in accordance with embodiments of the present disclosure provides a digital output in the form of an amount of time required for the unit pixel 304 to collect a selected level of signal, which corresponds to a selected amount of incident light. Alternatively or in addition, a series of count value outputs over some period of time can be transformed into a frequency that represents a photon flux amount at the unit pixel 304.

The clock signal 432 input to be can be a linear clock signal that is provided to all of the unit pixels 304 within the sensor array 204 simultaneously. Alternatively, the clock signal 432 can be provided as a non-linear clock signal that is provided to or generated within the unit pixels 304 included in the sensor array 204 simultaneously. In accordance with still other embodiments of the present disclosure, different clock signals 432 can be provided to or generated in unit pixels 304 individually.

Figure 5:
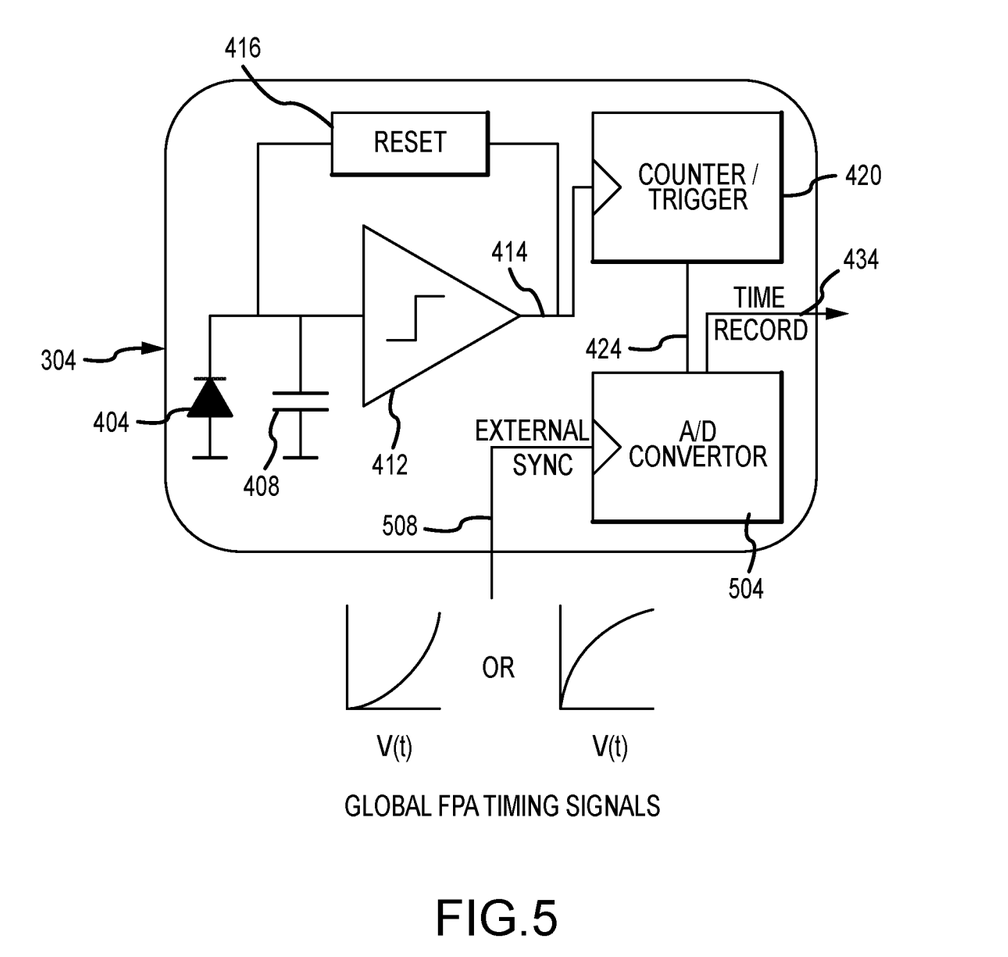
FIG. 5 depicts components of a rate focal plane array pixel in accordance with other embodiments of the present disclosure.

In accordance with further embodiments of the present disclosure, and as illustrated in FIG. 5, the unit pixel 304 can include an event recorder in the form of an analog to digital converter 504, in place of the counter 428. In such an embodiment, a linear or nonlinear global focal plane array timing reference 508 is input to the analog-to-digital converter 504, and is sampled when a trigger signal is received from the counter/trigger 420, creating an output 434 that provides a time record of the event at the unit pixel 304.

In still other embodiments, the counter 428 or the analog-to-digital converter 504 can be implemented as part of the readout circuitry 312. In such embodiments, the output 424 of the counter/trigger 420 can be provided to the readout circuitry 312 directly. Moreover, in such embodiments a clock signal 432 need not be provided to each unit pixel 304. However, as in other embodiments, the measurement made by an individual unit pixel 304 is the time required for that unit pixel 304 to acquire some selected quantity of charge in response to received light. Accordingly, the output of a sensor array 204 in accordance with embodiments of the present disclosure represents a rate at which photons arrive at the pixels 304 of the sensor array 204.

Figure 6:
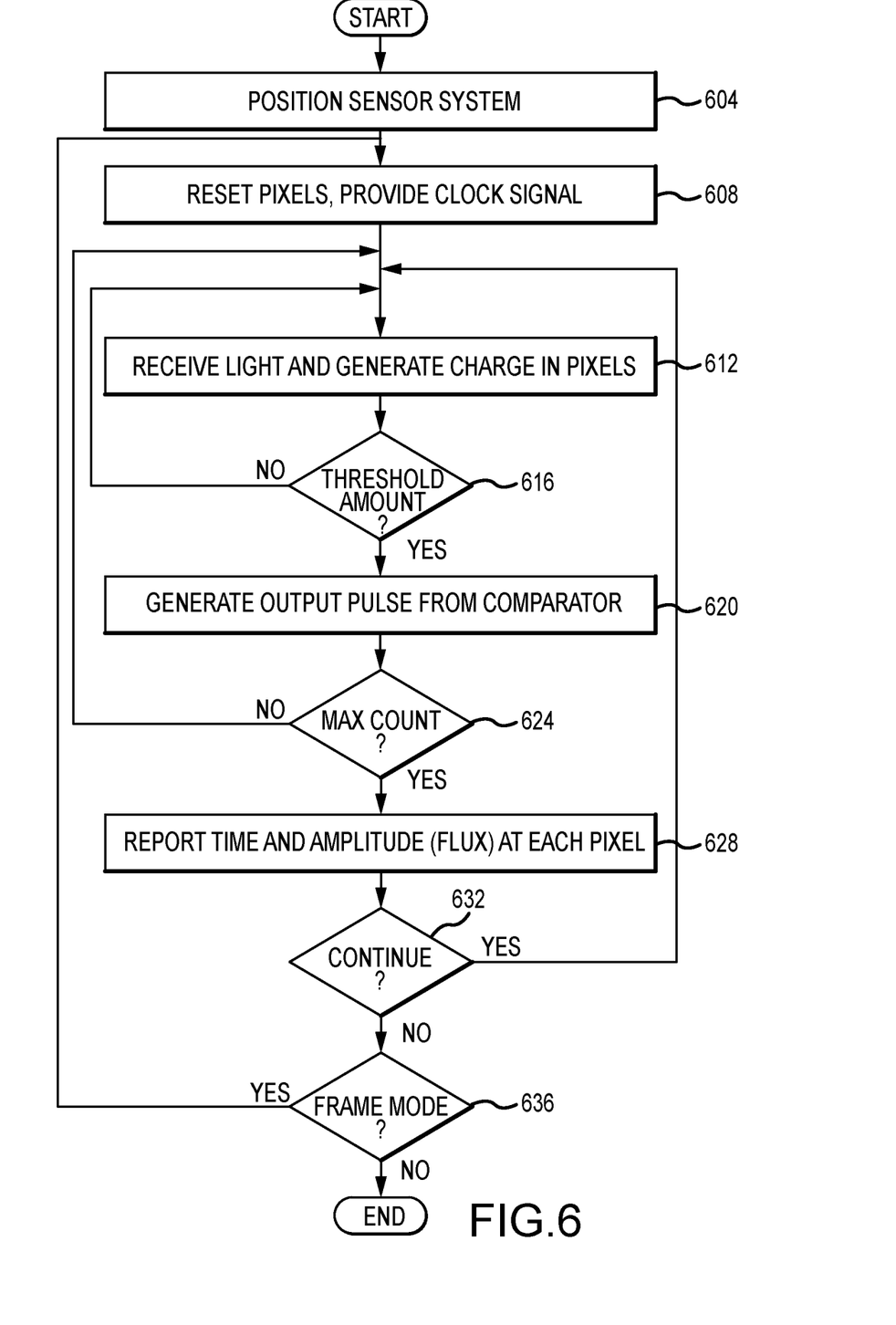
FIG. 6 is a flowchart depicting aspects of the operation of a rate focal plane array in accordance with embodiments of the present disclosure.

FIG. 6 is a flowchart depicting aspects of the operation of a rate focal plane array pixel in accordance with embodiments of the present disclosure. Initially, at step 604, the sensor system 108 and/or the platform 104 is positioned such that the field of view 112 of the sensor system 108 encompasses a scene of interest. At step 608, the unit pixels 304 included in the sensor array 204 of the sensor system 108 are reset, and a clock signal 432 is provided to each of the unit pixels 304. As can be appreciated by one of skill in the art after consideration of the present disclosure, resetting the pixels 304 can include placing a voltage of the charge accumulation region of the pixel at a reference voltage level.

Following the reset operation, light from within the scene causes the photodetector 404 within each unit pixel 304 receiving that light to generate charge, which is accumulated in the respective charge accumulation areas (e.g. integrating capacitors 408) (step 612). Once the charge on the capacitor 408 of a unit pixel 304 reaches a predetermined amount (step 616), the comparator 412 generates an output pulse 414, which in turn increments (or decrements) the counter/trigger 420 and causes the reset circuit 416 to reset the charge on the capacitor 408 of that unit pixel 304 (step 620). If a threshold number of counts, corresponding to a threshold amount of light, has been recorded at a unit pixel 304 (step 624), that unit pixel outputs a trigger signal 424 to the counter 428, which outputs a signal to provide a time record of the event 434 (step 628). This time record thus provides a measure of the amount of time required by the unit pixel 304 to accumulate a selected amount of charge, and thus the amount of time required to receive a corresponding amount of light. At step 632, a determination can be made as to whether photon arrival rate detection should continue. If so, the process can return to step 612, and the collection and marking of photon arrival at individual pixels 304 can continue. If not, a determination can next be made as to whether the sensor 204 should be operated in a frame mode (step 636). If the sensor 204 is being operated in a frame mode, the process can return to step 608, at which all of the pixels 304 of the sensor 204 can be reset, and the accumulation of photons by individual pixels 304 and the determination of the rate of arrival of photons at the pixels 304 can continue from the time of the reset.

As can be appreciated by one of skill in the art after consideration of the present disclosure, different unit pixels 304 may receive light at different rates, resulting in the generation of event signals 434 at different times for different unit pixels 304. Accordingly, the output of the pixel array 204 is provided by the unit pixels 304 asynchronously. As can also be appreciated by one of skill in the art after consideration of the present disclosure, the steps of measuring and marking a rate of photon arrival at a pixel 304 (steps 612 through 632) are generally performed for each pixel 304 within the array 204 in parallel. Accordingly, output or event signals 434 from different unit pixels 304 are provided to the output circuit 312 asynchronously. Moreover, a frequency of a series of clock value output signals 434 generated by a pixel 304 can be transformed into a representation of a rate of photon arrival at the pixel 304.

As noted, in accordance with at least some embodiments of the present disclosure, the unit pixels 304 can be operated asynchronously, with each unit pixel 304 outputting a time record of the event 434 corresponding to a threshold amount of light being received at the unit pixel 304. Accordingly, a sensor array 204 as disclosed herein can provide a compressed data stream as compared to conventional sensors that output a signal from each pixel after a selected exposure time has elapsed. Moreover, in the absence of light incident on a pixel, no output is generated by that pixel 304. In accordance with at least some embodiments of the present disclosure, charge can continue to be collected until each pixel has output an event signal 434. Alternatively, where the sensor array 204 is operated on a frame basis, an amount of light received at each of the unit pixels 304 is read out after some selected period of time, even if an event corresponding to the threshold amount of light being received has not been generated by all of the unit pixels 304.

A focal plane array in accordance with embodiments of the present disclosure takes the counting in the pixel unit cell 304 and splits its function. One part of the counter remains in the standard role, counting the number of times the incoming photon flux flips the comparator (analog circuitry creating the pixel least significant bit—LSB). The second part of the counter is used to generate a clock reference, creating the time record for the triggering event.

As discussed herein, a sensor 204 can include an array of multiple unit pixels 304. In still other embodiments, a sensor system 108 can incorporate a single unit pixel 304 as disclosed herein.

Embodiments of the present disclosure provide high dynamic range imaging. In particular, while dynamic range has been determined by time measurement resolution, a sensor system 204 as described herein can provide essentially unlimited dynamic range. In addition, different trigger threshold values can be established for different pixels 304 within a sensor 204. Accordingly, different trigger thresholds can be selected for different parts of the array to further the measurement range of single image samples. In contrast, conventional methods of acquiring high dynamic range images require taking multiple samples (images) at different integration times and then combining the multiple samples, yielding both time line and non-uniformity correction challenges.

Photon rates for different functions can be managed through programming the trigger level of the pixels 304. This gives the readout more capability than prior designs to handle signal from multiple wavebands or between passive and active imaging modes.

Non-uniformity correction of flux (photon rate) information is simpler for operation at different integration times. In particular, while previous systems must store data tables for a preplanned group of integration times (most scene-based corrections still rely on some component of these factory tables), one data set collected by embodiments of the present disclosure in flux terms can correct all modes, allowing complete optimization to flux conditions in the field, expected or not.

Moreover, because embodiments of the present disclosure are measuring time, rather than an amount of light for some selected exposure period, there can be more flexible ways of photon counting, leading to further benefits. The standard digital focal plane array toggles the counter at a linear rate based on the associated analog comparator. The clock in accordance with embodiments of the present disclosure could be counting using a non-linear time scale selected to proved more signal resolution.

In accordance with at least some embodiments of the present disclosure, the operation of the counters within the unit pixels 304 can be stopped after a selected signal level has been reached. Stopping the counters at a given signal level reduces the power used by the array. Intense signals reach their latch level quickly and no longer burn power toggling away for the remainder of the integration time. This in turn results in a reduction in the amount of heat produced by the sensor 204. Power consumption and the associated cooling requirements are one of the main challenged to using the current DFPAs.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
   positioning a sensor system having an optical assembly and a first sensor array including a plurality of unit pixels to collect light from within a selected field of view;
   resetting the plurality of unit pixels;
   after resetting the plurality of unit pixels, directing light collected by the optical assembly from within the selected field of view to the plurality of unit pixels, wherein each unit pixel in the plurality of unit pixels is capable of receiving light from the optical assembly simultaneously;
   generating charge in response to receiving incident light at a first photodetector of a first unit pixel included in the plurality of unit pixels of the first sensor array;
   in response to the first photodetector generating a first threshold amount of charge, generating a first event signal;
   marking a time at which the first event signal is generated;
   providing the time at which the first event signal is generated as a first output;
   generating charge in response to receiving incident light at a second photodetector of a second unit pixel included in the plurality of unit pixels of the first sensor array,
   wherein generation of at least some charge by the first photodetector occurs at a same time as generation of at least some charge by the second photodetector;
   in response to the second photodetector generating one of the first threshold amount of charge or a second threshold amount of charge, generating a second event signal;
   marking a time at which the second event signal is generated;
   providing the time at which the second event signal is generated as a second output, wherein the time at which the first event signal is generated is different than the time at which the second event signal is generated; and
   after generating the first and second event signals, again resetting the plurality of unit pixels.

2. The method of claim 1, wherein the first event signal is one of a plurality of first event signals, the method further comprising:
   generating a plurality of the first event signals in series; and
   marking a time at which each of the first event signals is generated.

3. The method of claim 2, further comprising:
   transforming the times at which each of the first event signals is generated into a frequency.

4. The method of claim 2, wherein marking a time at which each of the first event signals is generated includes recording a time at which each of the first event signals is generated.

5. The method of claim 2, wherein marking a time at which each of the first event signals is generated includes determining an amount of time that has elapsed between subsequent pairs of first event signals.

6. The method of claim 2, wherein a time between at least a first subsequent pair of first event signals differs from a time between at least a second subsequent pair of first event signals.

7. The method of claim 1, wherein the first event signal is one of a plurality of first event signals, and wherein the second event signal is one of a plurality of second event signals, the method further comprising:
   generating a plurality of the first event signals in series;
   marking a time at which each of the first event signals is generated;
   generating a plurality of the second event signals in series; and
   marking a time at which each of the second event signals is generated.

8. The method of claim 7, wherein a time period during which the plurality of first event signals is generated at least partially overlaps with a time period during which the plurality of second event signals is generated.

9. The method of claim 7, further comprising:
   transforming the times at which each of the first event signals is generated into a first frequency; and
   transforming the times at which each of the second event signals is generated into a second frequency.

10. The method of claim 9, wherein the first and second frequencies are different.

11. The method of claim 1, further comprising:
counting a number of times a selected amount of charge is generated in response to receiving incident light at the first photodetector; and
after a selected number of counts have been accumulated, generating the first event signal.

12. The method of claim 1, wherein the first and second event signals are generated asynchronously.

13. The method of claim 1, wherein the unit pixels of the first sensor array are disposed in a focal plane array.

14. The method of claim 1, further comprising:
operating the sensor system on a frame basis, wherein an amount of charge from each of the unit pixels in the first sensor array is read out after a selected period of time.

15. A sensor, comprising:
an optical assembly;
a focal plane array including a plurality of unit pixels, wherein the optical assembly collects light from within a field of view of the sensor and directs that light to the unit pixels of the focal plane array, wherein each unit pixel in the plurality of unit pixel includes:
a photodetector, wherein the photodetector generates charge in response to receiving incident light from the optical assembly;
a charge accumulation region;
a comparator, wherein the comparator receives charge generated by the photodetector and accumulated in the charge accumulation region, and wherein the comparator generates a signal in response to detecting a threshold amount of charge generated by the photodetector; and
a counter/trigger, wherein the counter/trigger receives the signal generated by the comparator and is one of incremented or decremented with each signal generated by the comparator, and wherein the counter/trigger generates an event signal in response to reaching a selected count value; and
an output circuit, wherein the photodetectors of at least some of the unit pixels generate at least some charge simultaneously, wherein each of the unit pixels is operable to generate an event signal asynchronously, wherein the comparators of the at least some of the unit pixels generate a signal in response to detecting the threshold amount of charge generated by a corresponding photodetector at different times, wherein the output circuit is connected to each of the unit pixels and carries event signals asynchronously generated by the unit pixels, and wherein a time at which any unit pixel included in the plurality of unit pixels generates an event signal is marked or recorded.

16. The sensor of claim 15, wherein each unit pixel further includes:
an output counter, wherein the output counter is operable to at least one of mark or record a time of the event signal generated by the counter/trigger.

17. The sensor of claim 16, wherein the output counter of each unit pixel is incremented according to a clock signal.

18. The sensor of claim 17, wherein, for each unit pixel, the output counter generates an output in a form of current clock value in response to receiving a trigger signal from the counter/trigger.

19. The sensor of claim 15, wherein the charge accumulation region is a capacitor.

* * * * *